US008739122B2

(12) United States Patent
McKeeth

(10) Patent No.: US 8,739,122 B2
(45) Date of Patent: *May 27, 2014

(54) COMMAND LINE OUTPUT REDIRECTION

(75) Inventor: James McKeeth, Nampa, ID (US)

(73) Assignee: Mircon Technology, Inc., Boise, ID (US)

( * ) Notice: Subject to any disclaimer, the term of this patent is extended or adjusted under 35 U.S.C. 154(b) by 27 days.

This patent is subject to a terminal disclaimer.

(21) Appl. No.: 13/111,775

(22) Filed: May 19, 2011

(65) Prior Publication Data

US 2011/0225598 A1 Sep. 15, 2011

Related U.S. Application Data

(63) Continuation of application No. 09/449,782, filed on Nov. 26, 1999, now Pat. No. 7,958,491.

(51) Int. Cl.
*G06F 9/44* (2006.01)

(52) U.S. Cl.
USPC ............ 717/114; 717/101; 717/116; 717/141

(58) Field of Classification Search
None
See application file for complete search history.

(56) References Cited

U.S. PATENT DOCUMENTS

| 5,664,153 | A | 9/1997 | Farrell |
| 5,745,669 | A | 4/1998 | Hugard et al. |
| 5,758,154 | A | 5/1998 | Qureshi |
| 5,848,025 | A | 12/1998 | Marietta et al. |
| 5,862,379 | A | 1/1999 | Rubin et al. |
| 5,983,325 | A | 11/1999 | Lewchuk |
| 6,052,134 | A | 4/2000 | Foster |
| 6,052,756 | A | 4/2000 | Barnaby et al. |
| 6,061,253 | A | 5/2000 | Jeddeloh |
| 6,093,215 | A | 7/2000 | Buxton et al. |
| 6,141,792 | A | 10/2000 | Acker et al. |
| 6,151,701 | A | 11/2000 | Humphreys et al. |
| 6,177,939 | B1 * | 1/2001 | Blish et al. ..................... 715/770 |
| 6,182,279 | B1 | 1/2001 | Buxton et al. |
| 6,199,138 | B1 | 3/2001 | Jeddeloh |
| 6,212,598 | B1 | 4/2001 | Jeddeloh |
| 6,385,766 | B1 | 5/2002 | Doran et al. |
| 6,405,362 | B1 | 6/2002 | Shih et al. |
| 6,535,930 | B2 | 3/2003 | Stern et al. |
| 6,681,265 | B1 | 1/2004 | Hlava |

OTHER PUBLICATIONS

Hill, Tim. "The Windows NT Command Shell", Windows NT Shell Scripting. Copyright 1998. MacMillian Technical Publishing. (retrieved Jul. 15, 2012, available at http://technet.microsoft.com/en-us/library/cc723564.aspx#XSLTsection127121120120).*

(Continued)

*Primary Examiner* — Wei Zhen
*Assistant Examiner* — Matthew Brophy
(74) *Attorney, Agent, or Firm* — Fletcher Yoder, P.C.

(57) ABSTRACT

In one embodiment the invention provides a method to provide command line utility output to an application without the need of temporary files. The method includes receiving an identifier, receiving output from a command line utility, and storing the command line utility output in a system storage at a location identified by the identifier. In one illustrative embodiment, command line utility output is stored in a system registry database. In another illustrative embodiment, command line utility output is stored in a shared system memory. The method may be stored in any media that is readable and executable by a computer system.

20 Claims, 4 Drawing Sheets

(56) References Cited

OTHER PUBLICATIONS

Robichaux, Paul. "Admistering the Windows NT Registry" Chapter 8, Managing the Windows NT registry, 1998. Available at <http://technet.microsoft.com/en-us/library/cc749939.aspx>.*

"Internet Component Download", Microsoft Corporation, Jan. 1996, http://www.graphcomp.com/info/specs/ms/CODEDWLD.HTM.

"Microsoft Computer Dictionary Fifth Edition", p. 111 & 544, 2002, Microsoft Press, retrieved Dec. 15, 2004.

"Programming the Win32 Registry", http//www.geocities.com/SiliconValley/2072/prgw32rg.htm?20067.

"Using Command-Line Utilities", p. E1-#12, retrieved Dec. 15, 2004, www.cisco.com/univercd/cc/td/doc/product/rtmgmt/sw_nt-man/td_main/td_5_8/traf5_8/cmdline.pdf.

"Windows 95 Application Setup Guidelines for Independent Software Vendors" 1995, http://msdn.microsoft.com/library/techart/setup.htm.

"Windows 95 Secrets, 3rd Edition", p. 315, 1995, "The DOS Version of the Registry Editor", retrieved Dec. 15, 2004.

"Windows registry", Wikipedia; http://en.wikipedia.org/wiki/Windows_Registry, retrieved from google.com search Jan. 31, 2006.

Dietel, H.M.; "Operating Systems", (1990), p. 574, command line and redirection, p. 644, redirected output, output of a command piped to another command.

Hill, Tim; "The Windows NT Command Shell", 1998, retrieved from URL http://www.microsoft.com/technet/archive/winntas/deploy/prodspecs/shellscr.mspx?mfr=true on Oct. 15, 2007.

Kochan, Stephen G., Wood, Patrick H., "Exploring the UNIX System Second Edition, 1989, p. 11, p. 81-84, p. 103-111.

Russinovich, Mark, "inside the Windows NT Registry", Apr. 1997, WindowsNT Magazine, retrieved from http://www.winnetmag.com/Articles/Index.cfm?ArticleID=122, retrieved on Aug. 14, 2002.

Weber Systems, Inc. Staff, "UNIX User's Handbook", 1985, p. 170-177.

* cited by examiner

COMMAND LINE OUTPUT REDIRECTION

CROSS-REFERENCE TO RELATED APPLICATION

This application is a continuation of U.S. patent application Ser. No. 09/449,782, which was filed on Nov. 26, 1999.

BACKGROUND

The invention relates generally to computer system support of application program execution and, more particularly but not by way of limitation, to a method and apparatus for redirecting command line utility output to a non-application maintained storage location.

Many applications such as word processing and file viewing programs have occasion to access system information. Often, such system information is available only through command line (e.g., console) utilities. That is, utilities that are accessible only through a command line interface. Illustrative command line utilities include "dir" and "net view" commands available in the Microsoft WINDOWS® operating system and the "w" command available in UNIX® and UNIXe-like operating systems (provides a list of users logged onto a specified computer system).

One difficulty with command line utilities is that their output is not generally directly useable by an executing application. The conventional technique by which a user application obtains command line utility output is shown in FIG. 1. After a temporary text file is created (block 100), the command line utility whose output is desired is invoked via a standard interface (block 102). Output from the command line utility is piped to the temporary file (block 104), from which the application extracts and processes the desired data (block 106). Sound programming practice calls for the destruction/removal of the temporary file created in block 100 (block 108). It will be recognized that a temporary file may be created by the piping operation itself, i.e., during the acts of block 104. Nevertheless, the use of a temporary file is generally considered essential.

A problem with the technique of FIG. 1 is that the application invoking the command line utility may not have file creation privileges on the computer system. If this is so, then the application will be unable to obtain the desired data. Another problem is that if the disk the application has access to is full (i.e., incapable of accepting new or enlarged user files), any attempt to create a new file will generate an error. Yet another problem is that the file name chosen for the temporary file may already be in use. Still another problem is that many new PCs are disk-less and, thus, may not provide a mechanism through which user Initiated (i.e., user invoked application) file input-output is possible. A further problem with prior art techniques such as that shown in FIG. 1 is that maintenance of temporary files is left to the calling application. If the application that creates a temporary file fails to remove it, a plethora of useless files may be to generated over time.

Thus, it would be beneficial to provide a mechanism by which an application program may obtain output from a command line utility without the need to create a temporary file.

SUMMARY

In one embodiment the invention provides a method to provide command line utility output to an application without the need of temporary files. The method includes receiving an identifier, receiving output from a command line utility, and storing the command line utility output in a system storage at a location identified by the identifier. In one illustrative embodiment, command line utility output is stored in a system registry database, which is stored in active memory (temporary storage) when the system is active and stored in a file (permanent storage) when the system is inactive. In another illustrative embodiment, command line utility output is stored in a shared system memory. The method may be stored in any media that is readable and executable by a computer system.

DETAILED DESCRIPTION

Figure 2:
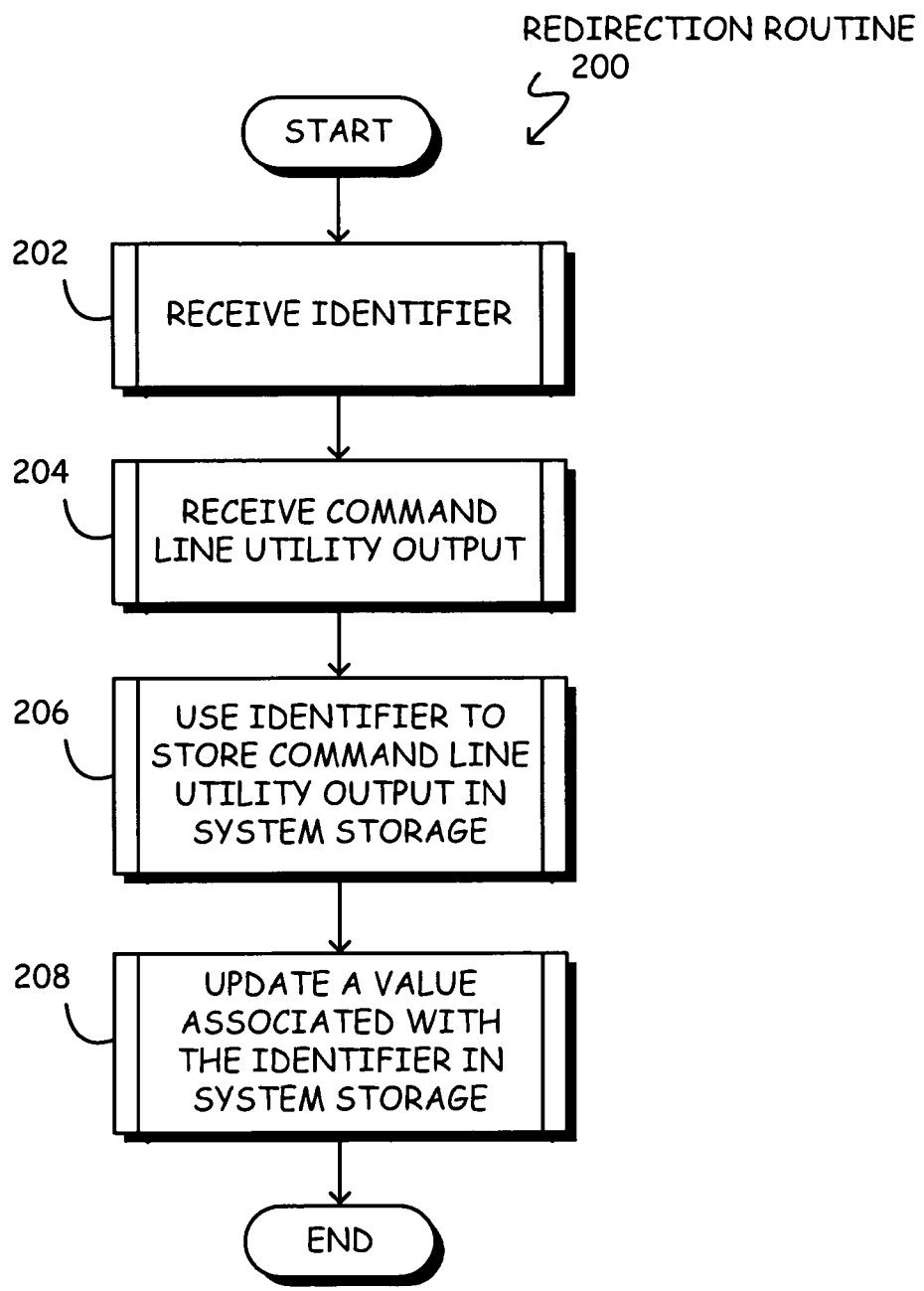
FIG. 2 shows, in flowchart form, the operation of a redirection utility in accordance with one embodiment of the invention.

Referring to FIG. 2, redirection routine 200 in accordance with one embodiment of the invention uses a user/application specified identifier (block 202) to identify command line utility output (block 204) which it stores in a system-wide storage location (block 206). By system-wide, it is meant that the storage location is available to all user applications and is, furthermore, maintained by operation of the underlying operating system. Following the act of storage in block 206, a value associated with the identifier in the system storage is updated to indicate completion of the redirection routine and to, possibly, provide additional information to the calling application such as the amount (e.g., number of lines) of information stored. Once redirection routine 200 completes the act of storing in block 206, the application invoking routine 200 may use the specified identifier to access the stored command line utility output.

Figure 1:
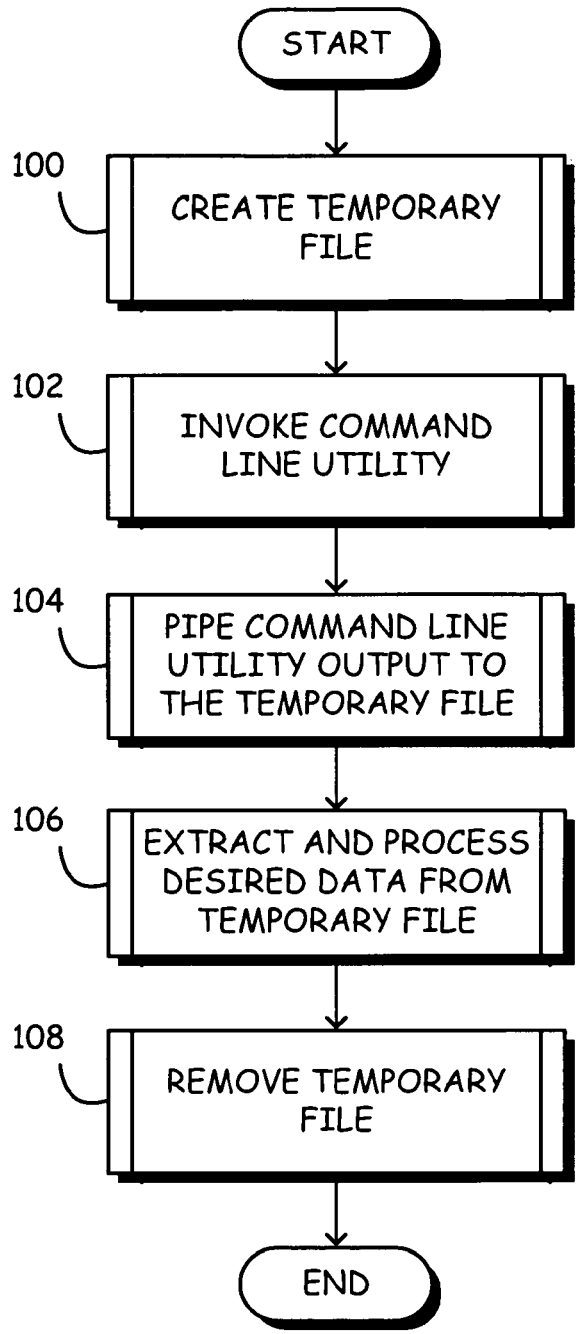
FIG. 1 shows a prior art technique by which an application obtains command line utility output.

One benefit of a redirection routine in accordance with FIG. 2 is that the calling application does not need file creation authority—no temporary files are created. Another benefit is that there is no need for the calling application to remove temporary files as in prior art techniques such as that illustrated in FIG. 1. A corollary of this benefit is that the calling application does not require file deletion authorization. Yet another benefit of a redirection routine in accordance with the invention is that a second application cannot inadvertently destroy the results generated by a first application by accidentally replacing or deleting a temporary file (e.g., a background process designed to remove temporary files).

Still another benefit of the invention is that the application invoking redirection routine 200 does not have to have disk I/O (input-output) authority as the storage location is maintained by the underlying operating system—the application makes I/O calls to the specified storage location through standard system calls (see discussion below).

By way of example, consider a situation in which an executing application needs information of the type provided by command line utility CMD-UTIL, where CMD-UTIL represents any utility executable from a command line prompt (e.g., the "dir" directory command of a Microsoft WINDOWS® operating system or the "head" command of a UNIX® operating system). In accordance with the invention, the application invokes a system call of the form:

CMD-UTIL [PARAM] |REDIRECT ID

Here, [PARAM] represents zero or more parameters that control or modify the 15 execution of the CMD-UTIL utility, the "|" symbol represents the piping function available in many operating systems such as WINDOWS®, UNIX® and derivatives thereof, REDIRECT is the name of routine 200, and ID is one or more parameters which REDIRECT routine 200 associates with output from CMD-UTIL during the act of storage in block 206 of FIG. 2.

It will be recognized that the calling application will generally ensure that the identifier it passes to routine 200 has either not been used or may be reused. It will further be recognized that command utilities may be stacked. That is, output from a first command utility (CMD-UTIL-1, for example) may be piped to a second, third, or Nth command utility (CMD-UTIL-N, for example) which may then be piped to routine 200. In this case, a system call in accordance with the invention would be:

CMD-UTIL-1 [PARAM]| . . . |CMD-UTIL-N [PARAM] |REDIRECT ID, where " . . . " represent one or more commands of the form CMD-UTIL-X [PARAM].

Because many current personal computer systems (PCs) are operated or controlled by one version or another of the Microsoft WINDOWS® operating system, an illustrative embodiment of redirection routine 200 utilizing the WINDOWS® system registry (hereinafter, the registry) will now be given. It will be recognized that the registry is an operating system generated and maintained database which application programs, application setup programs, and the operating system itself use to store configuration information.

Information stored in the registry is organized into hierarchical keys and associated key entries. Current versions of the registry use six predefined root keys (AKA Hives): HKEY_USERS; HKEY.CLASSES.ROOT; HKEY.CURRENT.USER; HKEY.CURRENT.CONFIG; HKEY_LOCAL_.MACHINE; and HKEY.DYN.DATA. Each key in the registry can have one or more sub-key entries. Each key and sub-key can have one or more names (a unique character string identifier) and each name can have an associated value (data stored in a defined manor, may be a character string, binary data, a number, a Boolean value, etc.). Each key and sub-key has one default key entry that has no name.

Access to the registry is provided through system calls defined in the registry application programming interface (API). Illustrative registry API functions include: RegEnumKeyEx, which enumerates the sub-keys of a specified key; RegOpenKeyEx, which opens and returns a handle to a specified key; RegEnumValue, which enumerates the key entries associated with a specified key; RegQueryValueEx, which returns the assigned value of a specified key entry; RegSetValueEx, which assigns a value to a specified key entry, creating the key entry if the key entry was not previously registered; RegDeleteKey, which removes a key from the registry; and RegDeleteValue, which removes a key entry from the registry. Using keys (hereinafter understood to include sub-keys) and registry API system calls, routine 200 can store command line utility output in the registry file. Using the same keys, an application program can retrieve information previously stored by routine 200.

Figure 3:
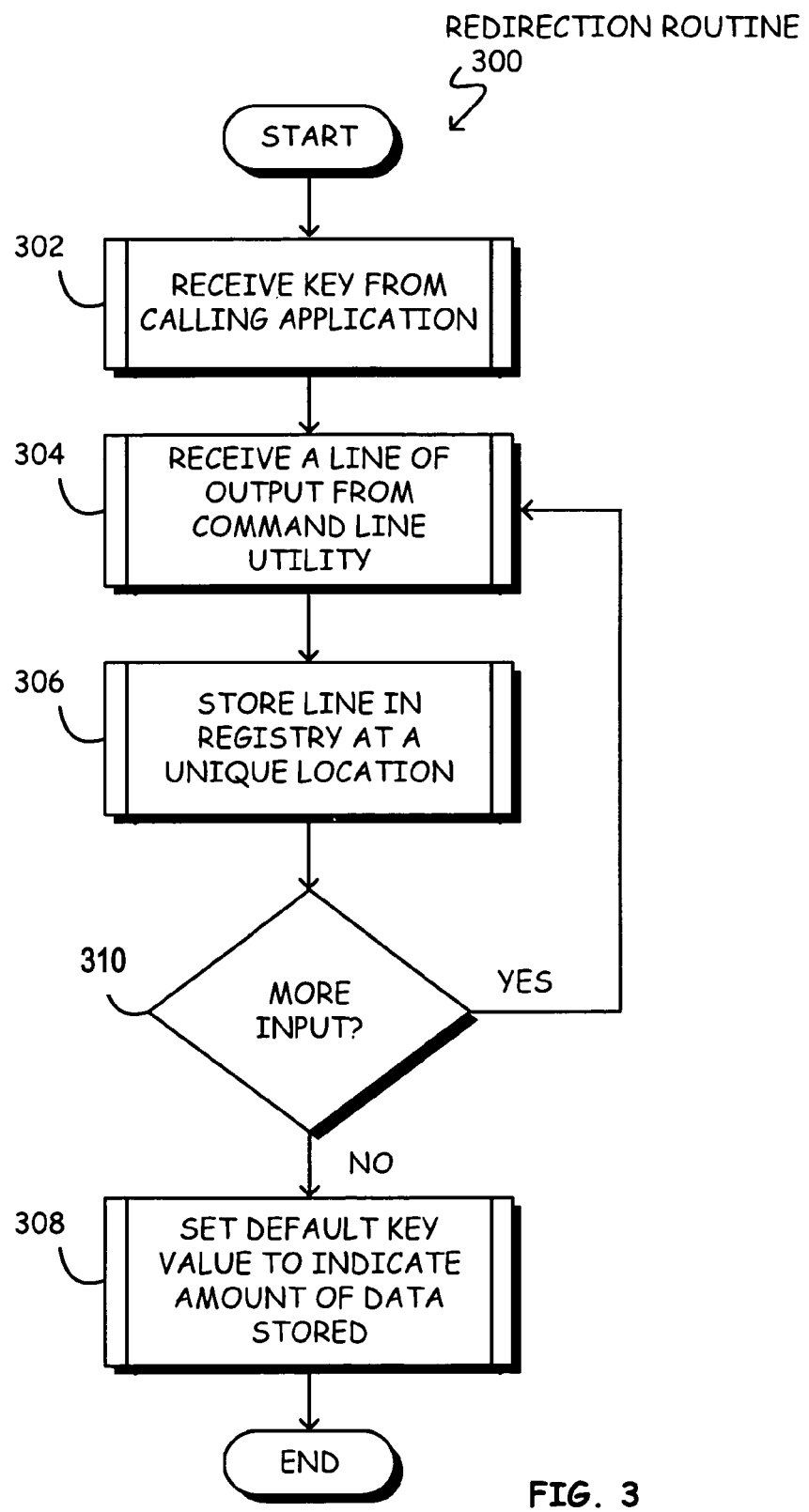
FIG. 3 shows, in flowchart form, the operation of a one specific redirection utility in accordance with FIG. 2.

Referring now to FIG. 3, in one embodiment WINDOWS® based redirection routine 300 receives an identifier comprising a key from a calling application (block 302). An illustrative key is HKEY.DYN.DATA/CMD-UTIL-OUTPUT-KEY. Routine 300 then begins receiving output from the CMD-UTIL utility, generally one line at a time as most command line utilities generate output targeted for line oriented standard output devices such as a computer display (block 304). The received line is stored in the registry at a key name that uniquely identifies the line (block 306). For example, each received line of output may be stored in the registry key:

HKEY.DYN.DATA/CMD-UTIL-OUTPUT-KEY, with a name of "N," where "N" is set equal to 1 for the first received line, 2 for the second received line, and so forth. A test is then made to determine if additional command line utility output is available for storage (diamond 308). If another line of output is available (the "yes" prong of diamond 308), processing continues as block 304. If no more output is available (the "no" prong of diamond 308), the default value of the received key (i.e., HKEY_DYN_DATA/CMD-UTIL-OUTPUT-KEY) is set equal to a value corresponding to the total number of lines received and stored by routine 300 (block 310). On completion, output from the command line utility CMD-UTIL is available for retrieval and manipulation by the calling application without the need to create, maintain or delete a temporary file.

In another embodiment, the ID parameter includes a storage location identifier. One value of the storage location identifier may direct use of the registry (or a similar operating system maintained database) while another value of the storage location identifier may direct use of operating system shared 30 memory (e.g., volatile random access memory). One example of operating system shared memory is the "clipboard" memory maintained by the WINDOWS® operating system.

Figure 4:
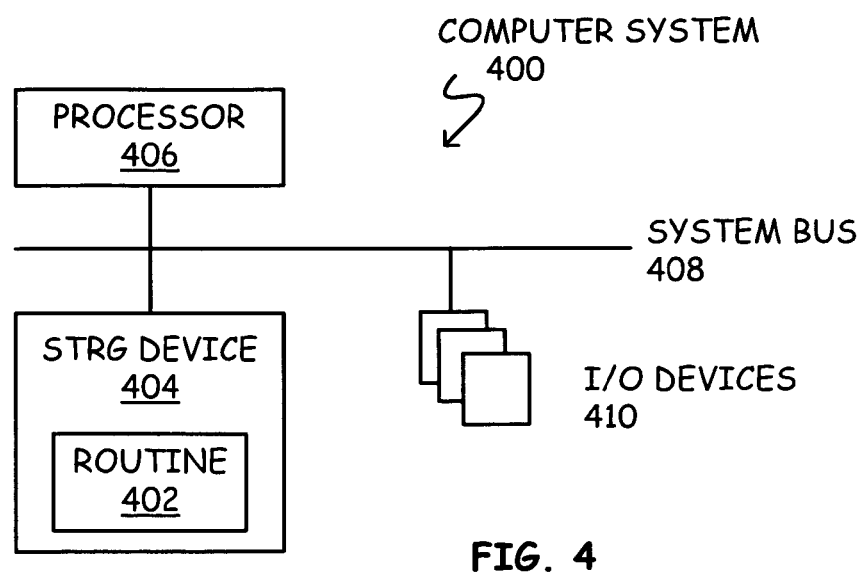
FIG. 4 shows a block diagram of a computer system incorporating a redirection routine in accordance with FIG. 2.

Referring now to FIG. 4, illustrative computer system 400 in accordance with one embodiment of the invention includes redirection routine 402 (e.g., a routine in accordance with 200 and/or 300) to redirect output from a command line utility to a specified operating system controlled memory location. As shown, routine 402 may be retained in storage device 404 which is coupled to processor 406 via system bus 408. It will be understood that storage device 404 may represent non-volatile memory devices or a combination of volatile and non-volatile memory devices. Illustrative non-volatile storage devices include, but not limited to: semiconductor memory devices such as EPROM, EEPROM, and flash devices; magnetic disks (fixed, floppy, and removable); other magnetic media such as tape; and optical media such as CD-ROM disks. It will be further recognized that computer system 400 may incorporate one or more input-output is devices 410 such as one or more secondary bus bridge circuits, memory controllers, accelerated graphics port devices and network interface adapters.

Various changes in the details of the illustrated operational methods as well as in the components of computer system 400 are possible without departing from the scope of the following claims. For instance, instructions to perform the acts of FIGS. 2 and 3 may be embodied in a program module implemented as, for example, a dynamic link library available through a standard interface. In addition, the illustrative system of FIG. 4 may include additional components such as network interface adapters and the like.

Thus, while the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A computer-implemented method comprising:
receiving, in a routine running in a computer, a location identifier configured to selectively identify between a clipboard storage location and a registry storage location, the location identifier comprising:
a first value configured to identify the clipboard storage location, wherein the clipboard storage location references a clipboard maintained by an operating system of the computer when selectively identifying the clipboard storage location; and
a second value configured to identify the registry storage location, wherein the registry storage location references a registry maintained by an operating system of the computer when selectively identifying the registry storage location;
receiving, in the routine running in the computer, output from a command line utility via a piping function of an operating system of the computer, wherein the command line utility is a utility executable in the operating system from a command line prompt; and
storing, by the routine running in the computer, the output received from the command line utility in the clipboard maintained by the operating system based upon the location identifier comprising the first value; or
storing, by the routine running in the computer, the output received from the command line utility in the registry based upon the location identifier comprising the second value.

2. The method of claim 1 wherein the command line utility is a first command line utility, and the routine is a second command line utility connected to the first command line utility in a system call via the piping function.

3. The method of claim 2 wherein the system call is from an application being executed in the operating system.

4. The method of claim 3 comprising receiving the system call from the application.

5. The method of claim 4 comprising providing the output from the clipboard to the application after the system call is completed.

6. The method of claim 1 wherein the clipboard is system shared memory maintained by the operating system and assessable to separate programs running in the operating system.

7. A non-transitory program storage device, readable by a computer, for storing instructions configured to instruct the computer to:
receive a request to execute, on the computer, a set of commands connected via a piping function of an operating system of the computer, the set of commands including a first command line utility and a second command line utility, wherein each of the first command line utility and the second command line utility is executable in the operating system from a command line prompt, wherein the request comprises a location identifier configured to selectively identify between a clipboard storage location and a registry storage location, the location identifier comprising:
a first value configured to identify the clipboard storage location, wherein the clipboard storage location references a clipboard maintained by an operating system of the computer when selectively identifying the clipboard storage location; and
a second value configured to identify the registry storage location, wherein the registry storage location references a registry maintained by an operating system of the computer when selectively identifying the registry storage location;
execute, on the computer, the set of commands including the first command line utility and the second command line utility;
receive output from the first command line utility and provide the output as input to the second command line utility, using the piping function of the operating system of the computer;
receive the output from the second command line utility; and
store the output received via the second command line utility in the clipboard maintained on the computer by the operating system based upon the location identifier comprising the first value; or
store the output received from the second command line utility in the registry based upon the location identifier comprising the second value.

8. The program storage device of claim 7 wherein the clipboard is operating system shared memory.

9. The program storage device of claim 8 wherein the clipboard is in volatile random access memory.

10. The program storage device of claim 7 wherein the request is received as a system call from an application running under the operating system of the computer.

11. The program storage device of claim 10 wherein the instructions are further configured to instruct the computer to provide the output received via the second command line utility from the clipboard to the application, after completion of the system call.

12. The program storage device of claim 7 wherein the instructions comprise the second command line utility.

13. The program storage device of claim 12 wherein the instructions comprise the operation system.

14. A computer, comprising:
a system bus;
at least one processor coupled to the system bus; and
at least one storage device coupled to the system bus, the at least one storage device storing instructions including an operating system and a first command line utility, the operating system configured to:
identify a storage location via a location identifier configured to selectively identify between a clipboard storage location and a registry storage location, the location identifier comprising:
a first value configured to identify the clipboard storage location, wherein the clipboard storage location references a clipboard maintained by an operating system of the computer when selectively identifying the clipboard storage location; and
a second value configured to identify the registry storage location, wherein the registry storage location references a registry maintained by an operating system of the computer when selectively identifying the registry storage location;
instruct the at least one processor to:
allocate a portion of the at least one storage device as a clipboard of the operating system based upon the location identifier comprising the first value, or
allocate a portion of a registry based upon the location identifier comprising the second value;
the first command line utility configured to:
receive input via a piping function of the operating system; and store the input received via the piping function of the operating system in the clipboard of the operating system based upon the location identifier comprising the first value; or store the input received via the piping function of the operating system in the registry based upon the location identifier comprising the second value.

15. The computer of claim 14 wherein the portion of the at least one storage device allocated as the clipboard of the operating system is in volatile random access memory.

16. The computer of claim 15 wherein the at least one storage device includes a non-volatile memory device.

17. The computer of claim 14 wherein the operating system is configured to receive a system call to execute a set of commands connected via the piping function of the operating system, the set of commands including the first command line utility and a second command line utility; and the system call is configured to pipe output from the second command line utility as the input to the first command line utility.

18. The computer of claim 17 wherein the system call is received from an application running under the operation system.

19. The computer of claim 18 wherein the operating system runs the application separately from execution of the first command line utility and the second command line utility in the system call.

20. The computer of claim 19 wherein the operating system is configured to provide the output, piped from the second command line utility into the first command line utility and stored via the first command line utility in the clipboard, to the application after completion of the system call.

* * * * *